US009307095B2

(12) United States Patent
Gao et al.

(10) Patent No.: US 9,307,095 B2
(45) Date of Patent: Apr. 5, 2016

(54) PREPAID SHORT MESSAGE SERVICES REVENUE CAPTURE

(71) Applicant: TeleCommunication Systems, Inc., Annapolis, MD (US)

(72) Inventors: Donghong Gao, Clarksville, MD (US); Lewis Tuttle, Stevensville, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/460,630

(22) Filed: Aug. 15, 2014

(65) Prior Publication Data

US 2014/0357225 A1    Dec. 4, 2014

Related U.S. Application Data

(63) Continuation of application No. 14/018,795, filed on Sep. 5, 2013, now Pat. No. 8,818,330, which is a continuation of application No. 13/396,170, filed on Feb. 14, 2012, now Pat. No. 8,682,289.

(60) Provisional application No. 61/547,259, filed on Oct. 14, 2011.

(51) Int. Cl.
*H04W 4/00* (2009.01)
*H04M 17/00* (2006.01)
(Continued)

(52) U.S. Cl.
CPC .............. *H04M 17/10* (2013.01); *G06Q 20/28* (2013.01); *H04W 4/12* (2013.01); *H04W 4/14* (2013.01);
(Continued)

(58) Field of Classification Search
CPC ... H04M 17/10; H04M 2215/28; H04W 4/24; H04W 4/14; H04W 4/12; G06Q 20/28; G06Q 20/223; G06Q 20/24; G06Q 20/26
USPC .................................. 455/466, 407, 406, 405
See application file for complete search history.

(56) References Cited

U.S. PATENT DOCUMENTS 6,052,710 A    4/2000 Saliba
6,058,428 A    5/2000 Wang
(Continued)

OTHER PUBLICATIONS

International Search Report received in PCTUS2011/00210 dated Jul. 27, 2012.
(Continued)

*Primary Examiner* — Khai M Nguyen
(74) *Attorney, Agent, or Firm* — Tarolli, Sundheim, Covell & Tummino LLP

(57) ABSTRACT

A prepaid messaging solution that utilizes a pre-delivery debit query to tariff a short message, coupled with an additional debit query performed once necessary billing information has been acquired. A short message is tariffed prior to message delivery via a pre-delivery debit query to a prepaid server. During message delivery, the prepaid server is queried a second time, following the HLR query performed by the Short Message Service Center (SMSC). This subsequent debit query bills a subscriber for any additional service fees discovered throughout message delivery, e.g., international/ roaming fees, etc. If either the pre-delivery debit query or the subsequent debit query indicates that a subscriber has insufficient account balance to deliver a short message, the message is prevented from being delivered. If a message is dropped due to lack of account balance, any funds debited throughout the attempted message delivery may be credited back to the subscriber's prepaid account.

10 Claims, 2 Drawing Sheets

(51) Int. Cl.
*H04W 4/24* (2009.01)
*G06Q 20/28* (2012.01)
*H04W 4/14* (2009.01)
*H04W 4/12* (2009.01)
*G06Q 20/22* (2012.01)
*G06Q 20/24* (2012.01)
*G06Q 20/26* (2012.01)

(52) U.S. Cl.
CPC .............. *H04W 4/24* (2013.01); *G06Q 20/223* (2013.01); *G06Q 20/24* (2013.01); *G06Q 20/26* (2013.01); *H04M 2215/28* (2013.01)

(56) References Cited

U.S. PATENT DOCUMENTS

| | | | |
|---|---|---|---|
| 6,128,653 | A | 10/2000 | Del Val |
| 6,139,177 | A | 10/2000 | Venkatraman |
| 6,459,904 | B1 | 10/2002 | Lorello |
| 6,564,249 | B2 | 5/2003 | Shiigi |
| 6,625,460 | B1 | 9/2003 | Patil |
| 6,665,489 | B2 | 12/2003 | Collart |
| 6,763,373 | B2 | 7/2004 | Shiigi |
| 6,801,781 | B1 * | 10/2004 | Provost ............... H04W 12/08 370/328 |
| 7,072,984 | B1 | 7/2006 | Polonsky |
| 7,092,697 | B1 * | 8/2006 | Kupsh ............... H04M 15/854 379/114.2 |
| 7,120,419 | B2 | 10/2006 | Batni |
| 7,243,152 | B2 | 7/2007 | Guggisberg |
| 7,269,431 | B1 | 9/2007 | Gilbert |
| 7,319,882 | B2 | 1/2008 | Mendiola |
| 7,761,105 | B2 | 7/2010 | Harding |
| 8,155,621 | B2 | 4/2012 | Jiang |
| 8,275,372 | B2 | 9/2012 | Jiang |
| 2001/0042107 | A1 | 11/2001 | Palm |
| 2002/0029189 | A1 * | 3/2002 | Titus ..................... G06Q 20/10 705/39 |
| 2002/0046253 | A1 | 4/2002 | Uchida |
| 2002/0077927 | A1 | 6/2002 | Lasnier |
| 2002/0126708 | A1 | 9/2002 | Skog |
| 2002/0198999 | A1 | 12/2002 | Smith |
| 2003/0028647 | A1 | 2/2003 | Grosu |
| 2003/0065615 | A1 | 4/2003 | Aschir |
| 2003/0069975 | A1 | 4/2003 | Abjanic |
| 2003/0091170 | A1 | 5/2003 | McCann |
| 2003/0172121 | A1 | 9/2003 | Evans |
| 2003/0191805 | A1 | 10/2003 | Seymour |
| 2003/0200301 | A1 | 10/2003 | Trzcinko |
| 2003/0208558 | A1 | 11/2003 | Venkatraman |
| 2003/0217291 | A1 | 11/2003 | Schramm-Apple |
| 2003/0224809 | A1 | 12/2003 | Savinen |
| 2003/0224811 | A1 | 12/2003 | Jain |
| 2003/0234815 | A1 | 12/2003 | Delaney |
| 2004/0002896 | A1 | 1/2004 | Alanen |
| 2004/0176067 | A1 * | 9/2004 | Lakhani et al. ............... 455/406 |
| 2004/0203614 | A1 | 10/2004 | Qu |
| 2004/0236710 | A1 | 11/2004 | Clary |
| 2005/0010694 | A1 | 1/2005 | Ma |
| 2005/0059418 | A1 | 3/2005 | Northcutt |
| 2005/0117602 | A1 * | 6/2005 | Carrigan ............... H04L 51/066 370/466 |
| 2006/0073810 | A1 | 4/2006 | Pyhalammi |
| 2007/0047702 | A1 | 3/2007 | Newell |
| 2007/0060131 | A1 | 3/2007 | Wilson |
| 2008/0160954 | A1 | 7/2008 | Agarwel |
| 2008/0270558 | A1 | 10/2008 | Ma |
| 2008/0281923 | A1 | 11/2008 | Barchi |
| 2009/0075627 | A1 | 3/2009 | Hwang |
| 2009/0081991 | A1 | 3/2009 | Titus |
| 2009/0276386 | A1 * | 11/2009 | Greening ............ H04L 12/5695 706/47 |
| 2010/0009701 | A1 | 1/2010 | Cai |
| 2010/0093315 | A1 | 4/2010 | Grosch |
| 2010/0151819 | A1 | 6/2010 | D'Englere |
| 2011/0102172 | A1 | 5/2011 | Chiu |
| 2011/0151852 | A1 | 6/2011 | Olincy |
| 2012/0220284 | A1 | 8/2012 | Tadayon |
| 2013/0273883 | A1 | 10/2013 | D'Englere |

OTHER PUBLICATIONS

International Preliminary Report on Patentability received in PCT/US2011/02004 dated Nov. 16, 2012.
International Search Report received in PCT/US2012/00086 dated Apr. 30, 2012.
International Search Report received in PCTUS2011/002004 dated Apr. 20, 2012.
International Search Report received in PCT/US12/00086 dated Mar. 8, 2013.

* cited by examiner

PREPAID SHORT MESSAGE SERVICES REVENUE CAPTURE

The present application is a continuation of U.S. patent application. Ser. No. 14/018,795, entitled "Prepaid Short Message Services Revenue Capture", filed on Sep. 5, 2013; which is a continuation of U.S. patent application Ser. No. 13/396,170, entitled "Prepaid Short Message Services Revenue Capture", filed on Feb. 14, 2012; which claims priority from U.S. Provisional Appl. No. 61/457,259, entitled "Prepaid Short Message Services Revenue Capture" to Gao et al., the entirety of all three of which is are explicitly incorporated herein by reference.

BACKGROUND OF THE INVENTION

1. Field of the Invention

This invention relates generally to wireless telecommunications. More particularly, it relates to short message services (SMS) to mobile devices.

2. Background of Related Art

Wireless service providers furnish subscribers with a multitude of wireless capabilities in return for compensation of services bestowed. Wireless service plans conventionally fall in to one of two categories: postpaid wireless or prepaid wireless.

In a postpaid wireless plan, a user enters into a long-term billing arrangement, i.e., a contractual agreement, with a particular service provider. Wireless service providers conventionally charge subscribers on a monthly basis for services consumed throughout the previous month. A consumer is billed for wireless usage according to terms articulated in a predefined wireless contract, in addition to any supplementary charges acquired in extra service fees, e.g., fees for services exceeding those offered in a wireless plan, international/long-distance fees, etc.

Alternatively, in a prepaid wireless plan, a subscriber purchases credit prior to service consumption. Purchased credit is then used to pay for wireless services as services are expended, i.e., Pay-As-You-Go. If a subscriber's prepaid wireless account no longer contains available credit, the subscriber is denied access to wireless services. The available balance in a prepaid wireless account may be queried by an affiliated service provider at any given time. Additionally, the amount of credit in a prepaid wireless account may be replenished at any given time via one of a multitude of payment mechanisms, e.g., a credit card interface, an SMS message, an Internet application, etc.

Prepaid wireless solutions enable a wireless service provider to accommodate individuals who are unable/unwilling to commit to a long-term service contract. In fact, fewer contractual obligations and minimal preliminary requirements have led to an enormous growth in prepaid wireless subscription.

Another wireless topology that continues to grow in popularity is the Short Message Service (SMS). The Short Message Service (SMS) is currently the most widely utilized data application in the world.

Short Message Service (SMS) enables bidirectional transmission of short alpha-numeric messages to and from a Short Message Entity (SME), i.e., a device or system capable of sending and receiving short messages.

A Short Message Service Center (SMSC) is an essential element in an SMS network. In operation, the Short Message Service Center (SMSC) is the first recipient of an SMS message en route from an originating device to a destination device.

A Home Location Register (HLR) in an SMS network encompasses a central database comprised of SMS subscriber information. The Short Message Service Center (SMSC) queries the Home Location Register (HLR) to determine which network is currently serving a mobile device. The Short Message Service Center (SMSC) uses routing information supplied by the Home Location Register (HLR) to successfully route a transmitted SMS message to an intended destination device.

In light of a surge of interest in the prepaid wireless scheme, many wireless carriers are beginning to offer prepaid wireless as an additional source of revenue. Though, prepaid messaging solutions still encompass a rather complex and often incomplete billing system.

Existing prepaid SMS solutions comprise a post-delivery prepaid SMS solution, a pre-delivery prepaid SMS solution, and a Reserve and Debit prepaid SMS solution.

The post-delivery prepaid SMS solution tariffs a short message following message transmission. In particular, the Short Message Service Center (SMSC) bills a subscriber for message delivery by transmitting a post-delivery debit query to a prepaid server. The debit query is transmitted to the prepaid server upon receipt of an SMS message on the destination subscriber's mobile device.

Unfortunately, querying the prepaid server following message delivery enables a message to be delivered for free, in the event that an SMS message is delivered to a prepaid subscriber with an insufficient account balance. The post-delivery prepaid SMS solution does not maintain any means of preventing an SMS message from being delivered based on a destination subscriber's lack of account credit. Hence, regardless of the balance in a destination subscriber's prepaid account, the subscriber's mobile device continues to receive SMS messages. Free message delivery ultimately results in a loss of profit for participating wireless service providers.

The pre-delivery prepaid SMS solution tariffs a short message prior to message delivery. In particular, the Short Message Service Center (SMSC) bills a prepaid account for message delivery by transmitting a pre-delivery debit query to a prepaid server. The debit query is sent to the prepaid server before a transmitted SMS message is delivered. If the debit query indicates that a destination subscriber's prepaid account does not contain adequate funds, the message is not delivered. Thus, the pre-delivery prepaid SMS solution prevents an SMS message from being delivered free of cost.

Unfortunately, the pre-delivery prepaid SMS solution is incapable of attaining billing information ordinarily discovered throughout the message delivery process. In particular, the individual network that is serving a destination device is not discovered until the Short Message Service Center (SMSC) queries the Home Location Register (HLR) for subscriber information. A Home Location Register (HLR) query, for instance, may identify a destination device as an international roamer, which conventionally attributes to additional message delivery fees. Yet, the debit query takes place prior to the Home Location Register (HLR) query in the pre-delivery prepaid SMS solution. As a result, the prepaid server is not notified, e.g., that a subscriber is internationally roaming, and additional roaming fees are left unaccounted for. While this may be advantageous to the subscriber, the wireless carrier service does not recover costs with respect, e.g., to messages transmitted to and from internationally roaming devices.

A Reserve and Debit SMS solution reserves a base fee prior to SMS delivery, but does not bill a subscriber until message delivery has concluded. In particular, the Short Message Service Center (SMSC) receives a transmitted SMS message and detects that the destination address designated in the received message corresponds to a prepaid wireless account. The Short Message Service Center (SMSC) subsequently sends a Reserve query to a prepaid server to reserve funds for conventional message delivery in the destination subscriber's prepaid account. The SMS message is then routinely delivered to the destination device. Following message delivery, the Short Message Service Center (SMSC) bills the destination subscriber's account by transmitting a post-delivery debit query to the prepaid server.

Complete billing is attainable in the Reserve and Debit SMS solution. The Reserve query assures that the amount of credit in a subscriber's account is at least enough to cover the base message delivery fee. Thus, messages are prevented from being delivered free of cost. Additionally, the post-delivery debit query transmitted to the prepaid server, assures that any additional fees discovered throughout message delivery are billed to the subscriber's account.

Unfortunately, complete billing is attainable in a Reserve and Debit SMS solution, but not always guaranteed. The possibility remains that a subscriber may have sufficient account credit to cover the basic message delivery fee reserved prior to message delivery. Though, a subscriber's prepaid account may not contain the funds required to cover additional fees discovered throughout message delivery. Thus, the Reserve and Debit SMS solution may result in unpaid additional service fees, e.g., roaming fees, international fees, etc. Additionally, the Reserve and Debit SMS solution is not widely supported.

It is apparent that wireless service providers are experiencing revenue leaks due to the incompetency of existing prepaid messaging solutions.

In an attempt to minimize the amount of revenue lost, certain wireless providers limit the scope of services and coverage offered to prepaid wireless customers. For instance, certain prepaid wireless providers may block messages destined to any mobile device currently operating on an international network. Moreover, a prepaid subscriber may not have the ability to roam. Yet, limiting the scope of provided services may additionally limit the quantity of interested consumers, likewise resulting in a decrease of revenue for wireless service providers.

SUMMARY OF THE INVENTION

In accordance with the principles of the present invention, a method for handling a prepaid messaging service comprises billing a subscriber for message delivery via two successive debit queries to a prepaid server. A short message is tariffed prior to message delivery via a pre-delivery debit query to a prepaid server. During message delivery, the prepaid server is queried a second time, following the Home Location Register (HLR) query performed by the Short Message Service Center (SMSC). This subsequent debit query, in accordance with the principles of the present invention, assures that a subscriber has sufficient account balance to fund any additional service fees discovered throughout message delivery.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a prepaid messaging solution that enables wireless service providers to accurately bill prepaid subscribers for SMS message delivery.

In particular, the disclosed prepaid messaging solution utilizes a pre-delivery debit query coupled with an additional debit query, performed once necessary billing information has been acquired. Successive debit queries assure that a prepaid subscriber has adequate account balance to fund all service fees accumulated throughout message delivery.

Figure 1:
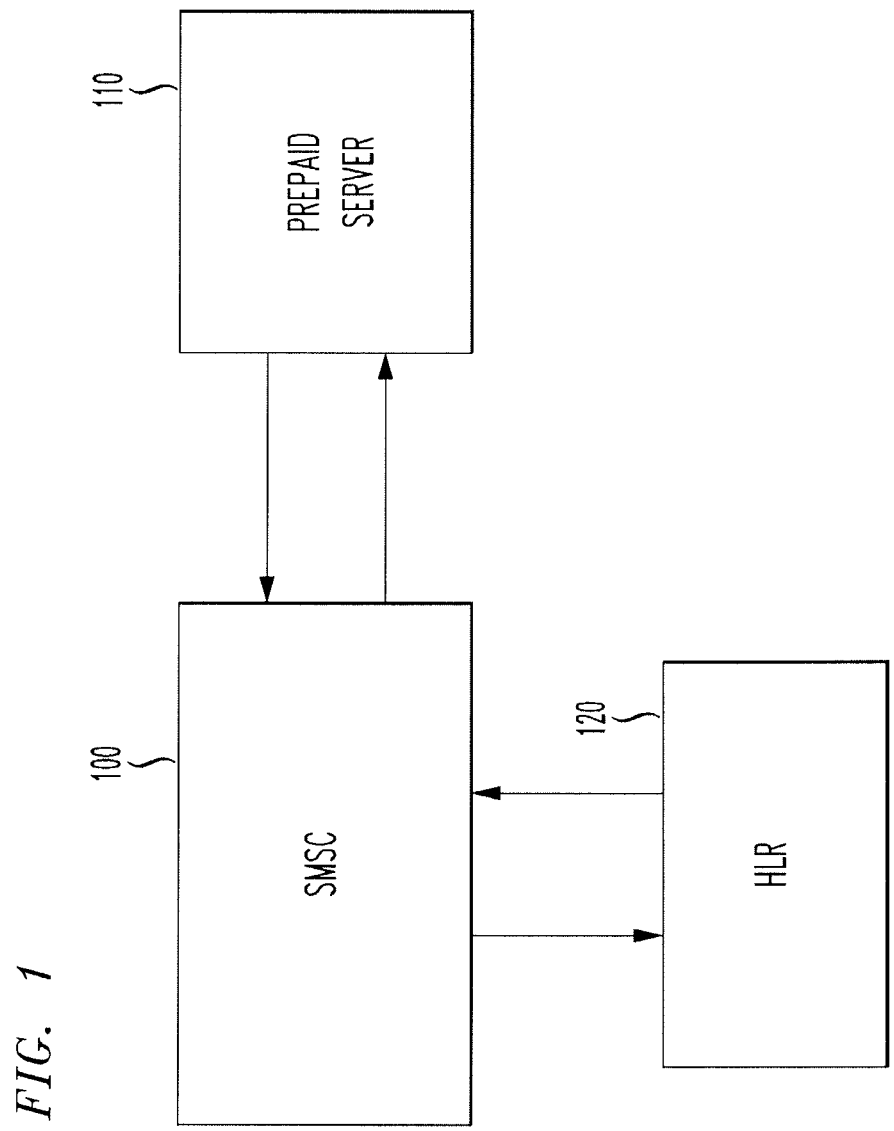
FIG. 1 depicts an exemplary network structure, in accordance with the principles of the present invention.

FIG. 1 depicts an exemplary network structure, in accordance with the principles of the present invention.

In particular, network elements necessary to explain the principles of the present invention include a Short Message Service Center (SMSC) 100, a prepaid server 110, and a Home Location Register (HLR) 120.

The Short Message Service Center (SMSC) 100, depicted in FIG. 1, is an SMS network element that intercepts SMS messages en route from an originating device to a destination device. When the Short Message Service Center (SMSC) 100 identifies that an originating address or a destination address designated in a received SMS message corresponds to a prepaid wireless account, the Short Message Service Center (SMSC) 100 queries the prepaid server 110.

The prepaid server 110 encompasses a database comprised of prepaid subscriber account information. The Short Message Service Center (SMSC) 100 may send a debit query to the prepaid server 110 to deduct funds from a prepaid subscriber's account for a particular wireless service. Likewise, the Short Message Service Center (SMSC) 100 may send a credit query to the prepaid server 110 to credit funds back to a particular subscriber's prepaid wireless account. In response to a query, the prepaid server 110 sends a confirmation to inform the Short Message Service Center (SMSC) 100 of the success or failure of the transmitted debit or credit query. For instance, a debit query is unsuccessful when a prepaid account does not have sufficient balance to fund the entire fee being debited.

The Home Location Register (HLR) 120 encompasses a database comprised of SMS subscriber information. During message delivery, the Short Message Service Center (SMSC) 100 queries the Home Location Register (HLR) 120 for information, e.g., network information, routing information, etc., pertaining to a destination device designated in a received SMS message.

Figure 2:
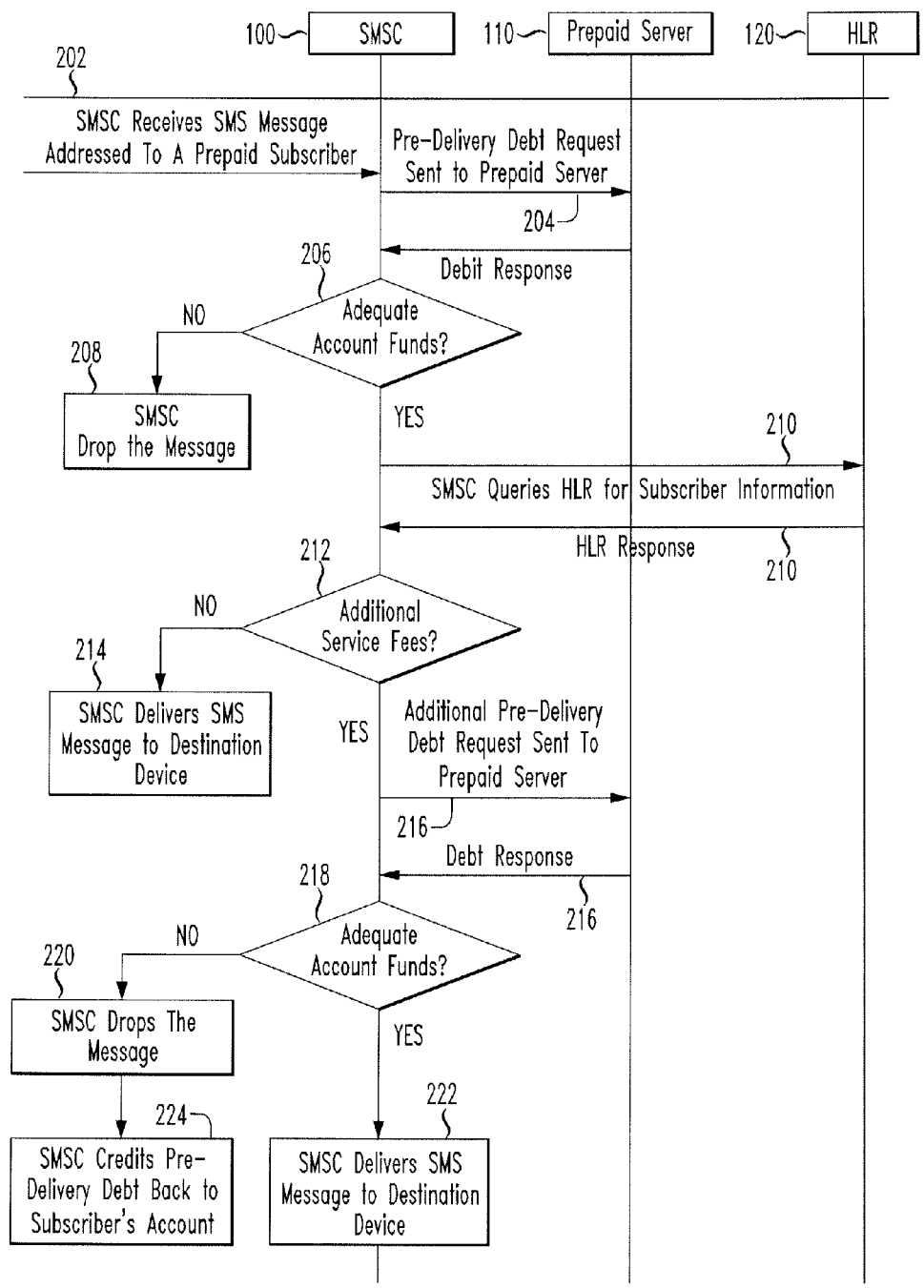
FIG. 2 depicts an exemplary process of implementing a prepaid messaging service, in accordance with the principles of the present invention.

FIG. 2 depicts an exemplary process of implementing a prepaid messaging service, in accordance with the principles of the present invention.

An SMS message addressed to a prepaid subscriber is transmitted by a message originator and subsequently received on the Short Message Service Center (SMSC), as depicted in step 202. Upon receipt, the Short Message Service Center (SMSC) determines that the Mobile Directory Number (MDN) identified in the destination portion of the SMS message, corresponds to a prepaid wireless account. Consequently, the Short Message Service Center (SMSC) bills the destination subscriber's prepaid account for message delivery by transmitting a pre-delivery debit query to a prepaid server in step 204. If the debit query indicates that the destination subscriber's prepaid account does not contain adequate funds (step 206), the message is not delivered (step 208). Alternatively, in step 206, if the subscriber's prepaid account does contain sufficient balance, then message delivery proceeds.

Following the pre-delivery debit query, the Short Message Service Center (SMSC) routinely queries the Home Location Register (HLR), as depicted in step 210, to determine which network is currently serving the destination device. In step 212, the Short Message Service Center (SMSC) assesses information returned by the Home Location Register (HLR), to determine if current network information for the destination device constitutes additional message delivery fees, e.g., roaming fees, international fees, etc. If additional information pertinent to billing is achieved, e.g., the destination subscriber is identified as an international roamer, then a subsequent debit query is transmitted to the prepaid server in step 216, to bill the destination subscriber accordingly.

If the subsequent debit query indicates that the subscriber does not contain sufficient account balance (step 218) to fund additional fees discovered during message delivery, e.g., roaming fees, etc., the SMS message is not delivered (step 220). Accordingly, if the message is dropped following the second debit query due to lack of account balance, the base message delivery fee debited in the pre-delivery debit query, may be credited back to the subscriber's account, as depicted in step 222.

Alternatively, if the subsequent debit query demonstrates that the subscriber's prepaid account does contain sufficient funds (step 218), then the SMS message is routed to the prepaid subscriber's destination device (step 224).

The pre-delivery debit query, in accordance with the principles of the present invention, prevents a message from being delivered free of cost. Moreover, the additional debit query performed following the Home Location Register (HLR) query, prevents unpaid additional service fees from being accumulated throughout message delivery.

A debit query, in accordance with the principles of the present invention, contains necessary billing information, coupled with the Message ID of the transmitted SMS message and the Subscriber Number associated with the destination subscriber. The Message ID/Subscriber Number combination enables the prepaid server to correlate the first debit query with the second debit query, in accordance with the principles of the present invention. Thus, the prepaid server is able to identify debit queries corresponding to the same message delivery. Therefore, if an SMS message is not delivered successfully, a credit query containing the corresponding Message ID/Subscriber Number combination may be transmitted to the prepaid server to credit all funds debited throughout the attempted message delivery, back to the appropriate prepaid account.

In another embodiment of the present invention the second debit query is performed following message delivery rather than following the Home Location Register (HLR) query.

A prepaid short messaging service in accordance with the principles of the present invention preferably supports service provider defined classes of service that uniquely identify subscriber rate and/or tariffing plans used to apply billing charges for sending and receiving messages.

The present invention additionally reduces the load to the Home Location Register (HLR) by validating subscribers against the prepaid server prior to attempting message delivery.

While the invention has been described with reference to the exemplary embodiments thereof, those skilled in the art will be able to make various modifications to the described embodiments of the invention without departing from the true spirit and scope of the invention.

What is claimed is:

1. A method of providing prepaid message services, comprising:
    receiving a text message from a mobile device associated with a prepaid account for text messages;
    initiating a pre-delivery debit query to a prepaid server to determine if said prepaid account is sufficient to deliver said text message;
    initiating delivery of said text message when said prepaid account indicates adequate funds to deliver said text message;
    subsequently initiating an additional debit query during said initiated delivery of said text message; and
    dropping said text message when said prepaid account indicates inadequate funds to cover an additional service fee identified after said pre-delivery debit query.

2. The method of providing prepaid message services according to claim 1, wherein:
    said additional service fee is identified in a home location register (HLR) query response.

3. The method of providing prepaid message services according to claim 1, further comprising:
    performing successive debit queries during delivery of said text message.

4. The method of providing prepaid message services according to claim 1, wherein:
    said additional service fee is identified in response to said additional debit query.

5. The method of providing prepaid message services according to claim 1, wherein:
    said text message is a Short Messaging System (SMS) message.

6. A short message service center (SMSC) comprising one or more computing devices, the SMSC being configured to:
    receive a text message from a mobile device associated with a prepaid account for text messages;
    initiate a pre-delivery debit query to a prepaid server to determine if said prepaid account is sufficient to deliver said text message;
    initiate delivery of dropping said text message when said prepaid account indicates does not have adequate funds to deliver said text message;
    subsequently initiate an additional debit query to the prepaid server during said initiated delivery of said text message; and
    drop said text message when said prepaid account indicates inadequate funds to cover an additional service fee is identified after said pre-delivery debit query.

7. The SMSC according to claim 6, wherein:
    said additional service fee is identified in a home location register (HLR) query response.

8. The SMSC according to claim 6, wherein the SMSC is further configured to
    perform successive debit queries to the prepaid server during delivery of said text message.

9. The SMSC according to claim 6, wherein:
    said additional service fee is identified in response to said additional debit query.

10. The SMSC according to claim 6, wherein:
    said text message is a Short Messaging System (SMS) message.

* * * * *